United States Patent [19]
Kolpek et al.

[11] 3,749,849
[45] July 31, 1973

[54] DICTATION SYSTEM FEATURING PARAGRAPH EDITING, SPECIAL NOTATIONS AND SENTENCE EXTENSION

[75] Inventors: Robert A. Kolpek; William R. Stewart, Jr., both of Lexington, Ky.

[73] Assignee: International Business Machines Corporation, Armonk, N.Y.

[22] Filed: Dec. 22, 1971

[21] Appl. No.: 210,861

[52] U.S. Cl. ........... 179/100.2 B, 179/100.1 DR, 179/100.2 MD, 179/100.1 S

[51] Int. Cl. ....................... G11b 27/08, G11b 15/02

[58] Field of Search ............... 179/100.2 B, 100.2 S, 179/100.2 MD, 100.1 DR; 340/174.1 B, 174.1 J, 172.5

[56] References Cited

UNITED STATES PATENTS

| | | | |
|---|---|---|---|
| 3,660,616 | 5/1972 | Davidge | 179/100.2 B |
| 3,671,683 | 6/1972 | Rahenkamp | 179/100.1 DR |
| 3,648,249 | 3/1972 | Goldsberry | 179/100.1 DR |
| 3,423,743 | 1/1969 | Silverman | 179/100.2 MD |
| 3,413,624 | 11/1968 | Murdoch et al. | 340/174.1 B |

*Primary Examiner*—Bernard Konick
*Assistant Examiner*—Alfred H. Eddleman
*Attorney*—D. Kendall Cooper et al.

[57] ABSTRACT

The present invention concerns a number of features for a Sentence Oriented Dictation System (SODS) having provision for recording and reproducing audio information in segments of convenient size, such as sentences and paragraphs. The present case concerns the capability of splitting the sentences in a particular paragraph into two or more groups of sentences, each comprising an individual paragraph and/or combining sentences from several paragraphs to form a single paragraph. Further, the invention concerns the provision of special areas on a record medium for the storing of instructions for guidance of the typist in the form of special notations. Also, the present invention concerns a system of this nature with provision for recording individual segments of audio information, such as sentences, in assigned storage areas on a record medium, each having storage capacity up to a certain predetermined size, and the capability of extending or continuing the sentences beyond the predetermined size.

21 Claims, 6 Drawing Figures

MEMORY CYCLES

CLOCK CYCLES

DICTATION SYSTEM FEATURING PARAGRAPH EDITING, SPECIAL NOTATIONS AND SENTENCE EXTENSION

BACKGROUND OF INVENTION, FIELD, AND PRIOR ART

The present inventive arrangements have particular usefulness in conjunction with a Sentence Oriented Dictation System (SODS) as described in various patent cases set forth below.

U. S. patent application Ser. No. 50,577, filed June 29, 1970, now U.S. Pat. No. 3,660,616 with Ronald V. Davidge, et al, as inventors; entitled "Dictating and Transcribing Systems Featuring Random Sentence Arrangement with Recognition and Location of Sentences In A Preferred Sequence."

U. S. patent application Ser. No. 50,605, filed June 29, 1970, now U.S. Pat. No. 3,671,683 with Robert A. Rahenkamp, et al, as inventors; entitled "Sentence Oriented Dictation System Featuring Random Accessing of Dictation Segments."

U. S. patent application Ser. No. 50,683, now abandoned, filed June 29, 1970, with Robert A. Kolpek as inventor; entitled "Sentence Oriented Dictation System Featuring Random Accessing of Infor-mation In A Preferred Sequence Under Control of Stored Codes."

The above listed patent cases are all assigned to the same assignee as the present case.

The SODS-type systems described in the aforementioned patent cases generally have provision for recording of sentences in assigned locations enabling the recording of individual sentences up to a predetermined desired length, such as, for example, 24 seconds. A SODS dictation unit includes sentence and paragraph selection keybuttons and additional special control keybuttons enabling the rearrangement of the sentences in a preferred sequence that may be different sequence in which they were originally recorded. This is done essentially in an electronic fashion, since the sentences ordinarily remain in the same storage cells that they occupied when recorded but addressing information controlling the accessing of the sentences in a preferred sequence is manipulated to revise the sequence, as desired. A SODS transcribing unit has the capability of reproducing and storing the preferred sequence accessing information and thereafter playing back the sentences in the preferred sequence in order that a typist may prepare a typed copy for the dictator to review.

None of the systems noted have features comparable to the features set forth in the present case.

SUMMARY OF THE INVENTION

Accordingly, the present invention is concerned with providing additional flexibility and capability in a Sentence Oriented Dictation System (SODS). As the dictation of audio segments proceeds, each segment is stored in an individual storage cell on the record medium, which as an example, may be in the form of a magnetic recording belt. The belt is divided into a number of individual tracks arranged in a side-by-side manner and each track extending about the periphery of the belt. The physical dimensions of the belt determine the length of each track and thus the amount of information that may be stored in each track. The audio segments, or sentences, are stored and manipulated under control of the dictator with a number of audio segments or sentences comprising individual paragraphs. That is, a group of tracks on the belt comprise a first paragraph, a second group of tracks comprise a second paragraph, etc. The split and combine features of the present invention contemplate that each paragraph comprises independent sentences. The sequence of accessing of the sentences and paragraphs is determined by a code sequence indicative of a preferred sequence and stored in the memory of the SODS unit.

The Split feature of the present case enables the operator to split a group of sentences comprising a particular paragraph into two individual groups of sentences comprising two or more paragraphs, as may be desired. The Combine feature enables the combining of two groups of sentences, that is, two paragraphs, into one paragraph as an example.

The Record Notes to Typist feature enables the recording of special instructions in a special area on the magnetic recording medium in a real time fashion as the dictator proceeds with dictation and allows the dictator to automatically access the special area and return to the proper location on the record medium for the next succeeding sentence in an automatic fashion.

Occasionally, a dictator after dictating a series of sentences of particular size, each occupying a respective storage track on the record medium, may realize that revision of one of the sentences is required. In the event that the revised sentence exceeds the storage capacity of the track in which the sentence was originally stored, the sentence extension scheme enables the jumping of storage cells and interconnection of the originally recorded sentence information with a new cell location in order to enable the continued recording of the longer sentence. The expansion may proceed beyond one additional cell. Special marks are used to indicate the use of cells in this manner. It is further contemplated that continuation of a particular sentence may proceed into the next adjacent cell, as well.

OBJECTS

Accordingly, a particular object of the present invention is to provide a Sentence Oriented Dictation System having provision for storing of sentences in individual tracks on a record medium and the combination of sentences into paragraphs and facilities for enabling the splitting and combining of sentences into new and different length paragraphs during revision procedures, and as desired by the operator.

Another object of the present invention is to provide in a system of this nature, facilities in the form of a special assigned area on the record medium for recording of special instructions or notations for use by a typist during transcription of the dictated material.

A still further object of the present invention is to provide in a system of this nature, facilities for the extension of sentences beyond the normal usually encountered length into other storage cells, the portions of a particular sentence possibly lying in cells somewhat removed from each other.

The foregoing and other objects, features, and advantages of the invention will be apparent from the following more particular description of various embodiments of the invention as illustrated in the drawings.

Figure 1:
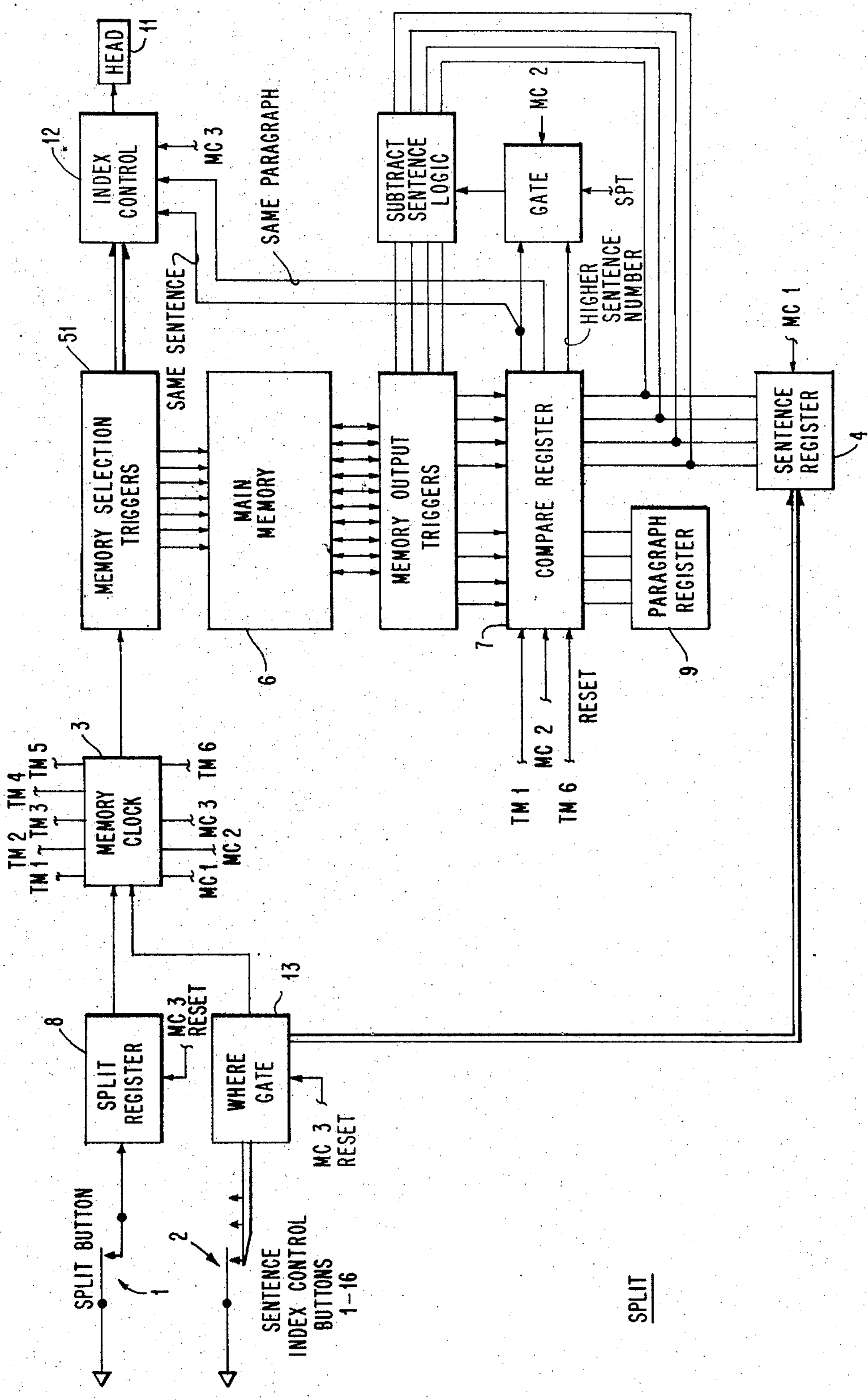
FIG. 1 represents a Sentence Oriented Dictation System illustrating the Split feature.
Figure 2:
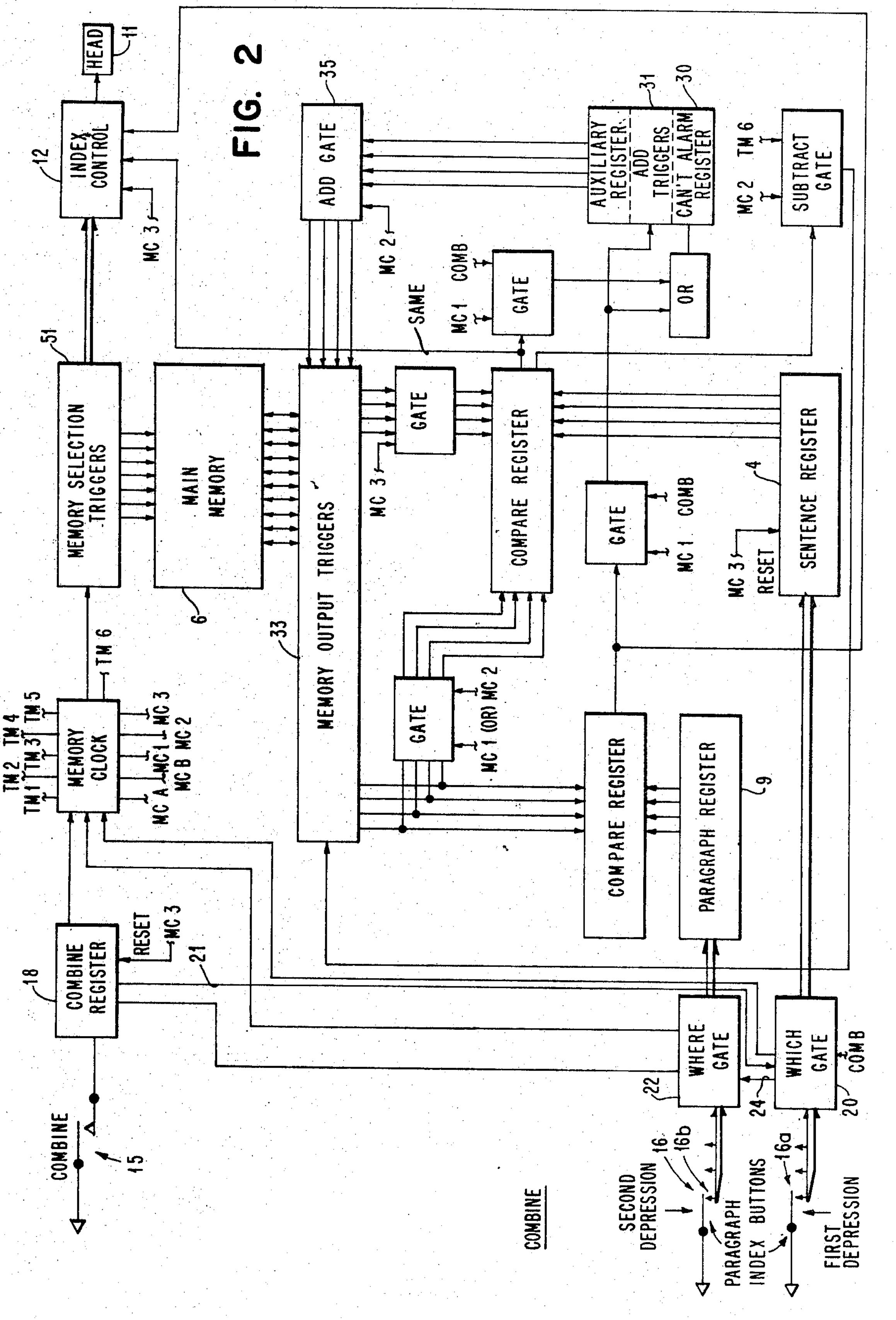
FIG. 2 illustrates a Sentence Oriented Dictation system featuring the Combine capability.
Figure 3:
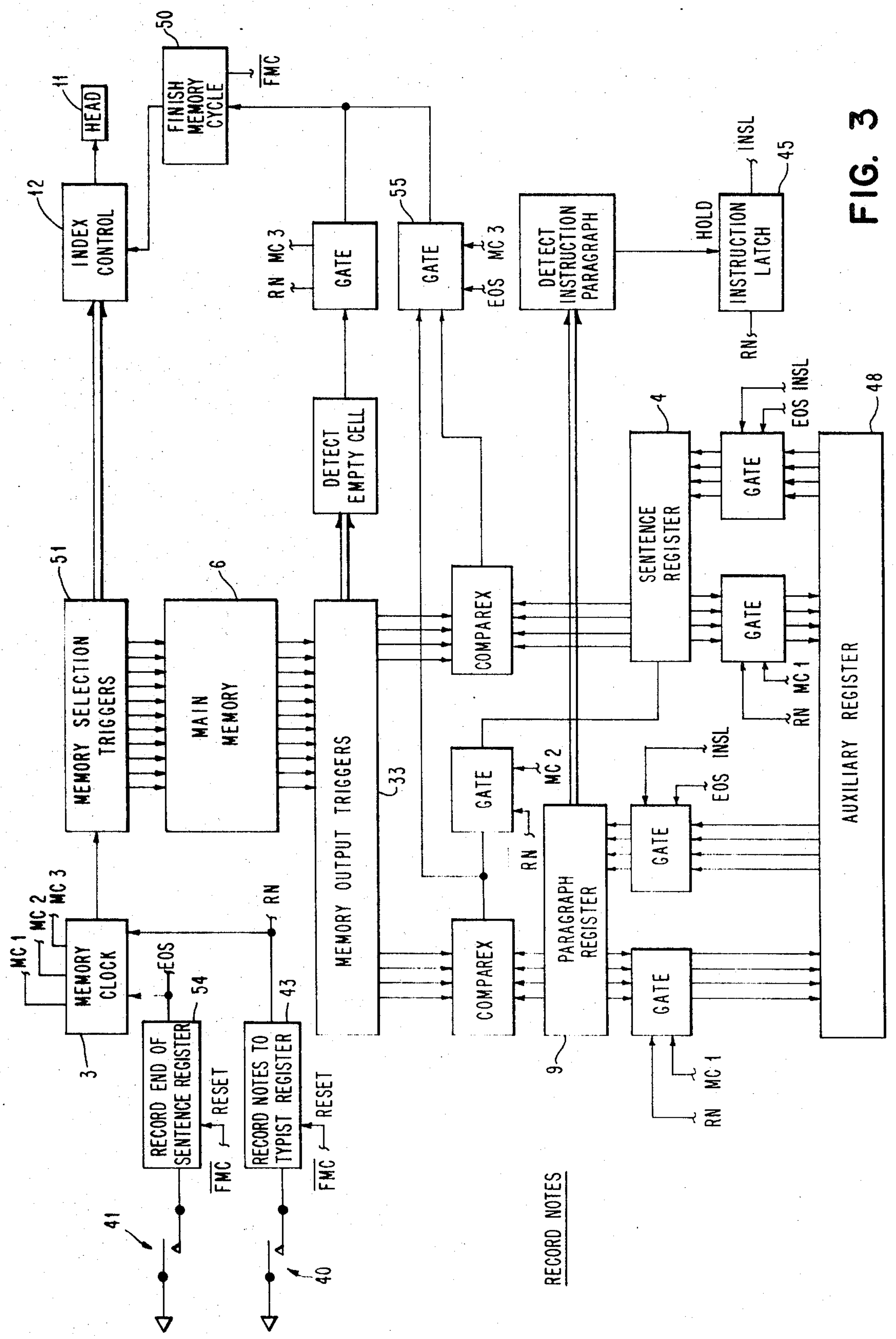
FIG. 3 illustrates the Record Notes to Typist feature for a system of this nature.
Figure 5A:
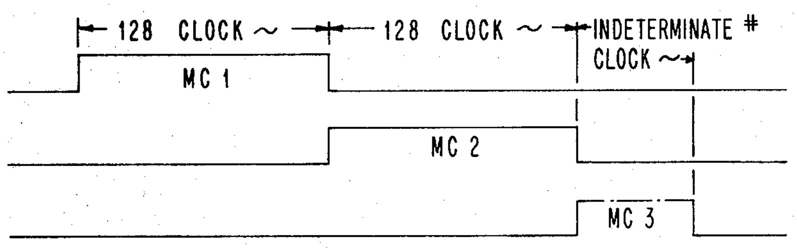
Figure 5B:
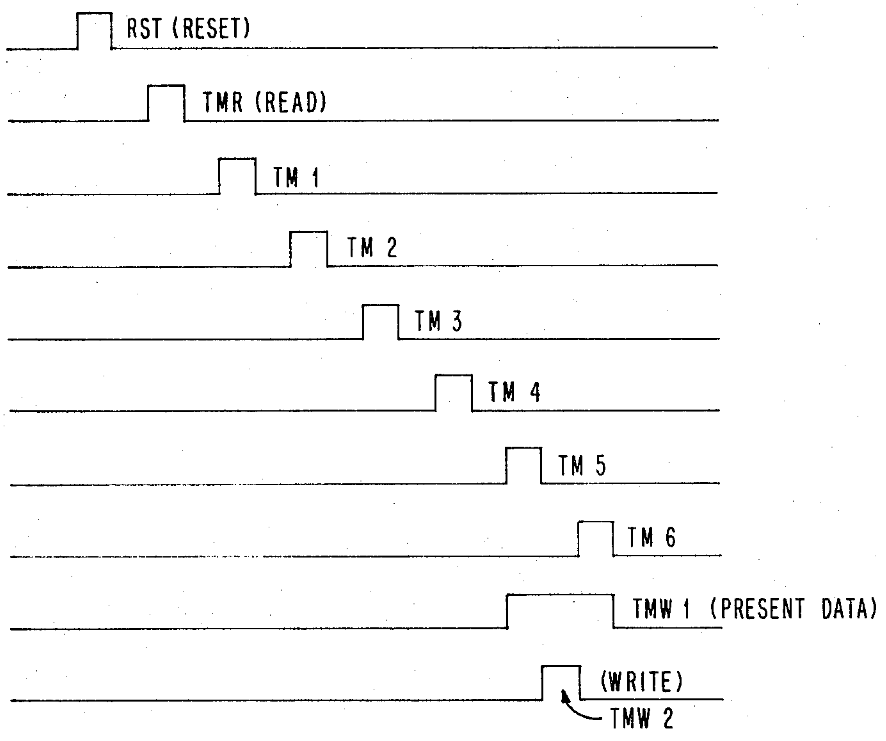

FIGS. 5*a* and 5*b* illustrate timing wave forms that are encountered in various portions of the systems illustrated in FIGS. 1–3.

GENERAL DESCRIPTION

Split and Combine Feature

While the moving of single sentences between paragraphs or to new paragraphs is described in the Kolpek application, this feature concerns the capability of moving multiple sentences in a single operation. Very often, it is necessary in the writing of a document to combine paragraphs which really have the same subject matter within them. It is desirable that the operator be able to combine paragraphs in any order and be able to combine any two paragraphs in the document. In addition, very often paragraphs become too long and actually more than one subject may be presented within a paragraph. When this occurs, it is desirable that the operator be able to split a paragraph at any point in that paragraph.

A block diagram describing the split operation is shown in FIG. 1. The operator first presses the split function keybutton 1 followed by a sentence keybutton 2 indicating the sentence that is to start the second paragraph. A similar diagram is shown for the combine operation in FIG. 2. In this operation, the operator first depresses the Combine keybutton 15, then presses the paragraph buttons 16 associated with the paragraphs to be combined in the order in which they are to be combined. If the total number of sentences in the two paragraphs to be combined exceeds 16, the combination is prevented and an alarm occurs. The alarm situation is maintained until the operator cancels the requested operation.

Detailed Operation

Split Operation

In order to best illustrate the function of Split keybutton 1, it is assumed that paragraph 3 contains eight sentences and that these eight sentences are to be split into two paragraphs, one containing five sentences and the other three sentences. Register 9 indicates the paragraph being edited. The operator first depresses Split button 1, FIG. 1. This preconditions the 16 sentence buttons in such a way that upon depression of a particular sentence button, the memory clock 3 is started and the sentence number is registered in the Sentence register 4 by way of "where" gate 13 during the MC 1 time of the memory cycle.

Memory cycles 2 and 3 (MC 2 and MC 3) follow immediately after memory cycle 1, as shown in FIG. 5a. Other timing sequences are shown in FIG. 5*b*. During MC 2, each of the cells in the main memory 6 are scanned by the Compare register 7. Each time the Compare register 7 shows that a cell contains a sentence for the paragraph to be split and the sentence is either greater than or the same as the sentence in the Sentence register 4, the number described by the contents of the Sentence register 4 is subtracted from the number of the sentence in the cell being scanned. Simultaneously, one count is added to the number of the paragraph associated with this cell. For instance, in the case where paragraph 3 is being split into two groups of five and three sentences, Sentence button number six will be pressed by the operator. When a cell is scanned designated for paragraph number 3 and its sentence is the same or greater than the sentence registered in the Sentence register 4 (that is, "6") the paragraph number is raised to 4 and the sentence count is reduced by five and rewritten into memory 6.

The following illustrates the split procedure:

| | Sentence No. | | | | | | | |
|---|---|---|---|---|---|---|---|---|
| Paragraph 3 | 1 | 2 | 3 | 4 | 5 | 6 −5 | 7 −5 | 8 −5 |
| | | | | | | 1 | 2 | 3 |
| Paragraph 4 | 1 | 2 | 3 | | | | | |

What results from this is that sentences 1 through 5 remain in the same paragraph, that is, the first five sentences in paragraph number 3 will remain in their normal positions. Sentences six, seven and eight are shifted into the next higher numbered paragraph (that is, paragraph number 4) and are reduced by the count of five to become sentences 1, 2 and 3. Now when cells containing sentences associated with paragraphs with still higher numbers than that indicated by the Paragraph register 9 (that is "3") are scanned, the paragraph count in these cells is increased by one. This means that the only sentences in paragraph 4 are the sentences formerly associated with six, seven and eight of paragraph 3. All sentences which have previously been in paragraph number 4 will be in paragraph number 5. All sentences in paragraph 5 will be in paragraph 6 and so on. Having rewritten the main memory during MC 2, the memory is again scanned looking for the cell which contains the sentence that corresponds to the same sentence and paragraph numbers registered in the paragraph and sentence registers 4 and 9. When this occurs during MC 3, the index control circuit resets the Split register 8 and positions the magnetic head 11 to an empty cell for recording the new sixth sentence of paragraph number 3. Positioning of head 11 is controlled by block 12.

Combine Operation

The operator initiates the Combine operation by pressing the Combine button 15, FIG. 2. This is registered in the Combine register 18 and conditions the "which" gate 20 to place a subsequent output of the paragraph index button **16*a* in the sentence register 4. The operator presses the paragraph index button 16*a* depositing the information in the sentence register 4 and conditions the "where" gate 22 by line 24. Depression of a paragraph index button 16*b* places the "where" paragraph number into the paragraph register 9. Immediately following this, memory cycle MC 1 occurs. During memory cycle MC 1, main memory 6 is scanned and the total number of sentences in both paragraphs is registered in the "can't" alarm register 30. If this number exceeds 16** an appropriate alarm will be sounded.

Also during memory cycle MC 1, the number of sentences in the "where" paragraph stored in register 9 is registered in the "add" triggers 31 for use during memory cycle MC 2. Memory cycle MC 2 begins immediately after memory cycle MC 1. During memory cycle MC 2, the main memory scans and looks for the "which" paragraphs stored in register 4. When a cell is scanned containing a sentence for a "which" paragraph, the paragraph portion of the memory output triggers 33 is reset and the identification of the "where" paragraph is substituted in main memory 6. Simultaneously, the sentence portion of the memory output triggers 38 is increased by the count registered in the "add" triggers 31, during memory cycle MC 1. This is accomplished by successive addition using the "add" gate 35 shown in FIG. 2. In addition, while scanning during memory cycle MC 2, when a cell is detected which contains a sentence for a paragraph having a higher number than the "which" paragraph, the paragraph portion of the memory output triggers 33 is reduced by one count.

The following illustrates the combine procedure:

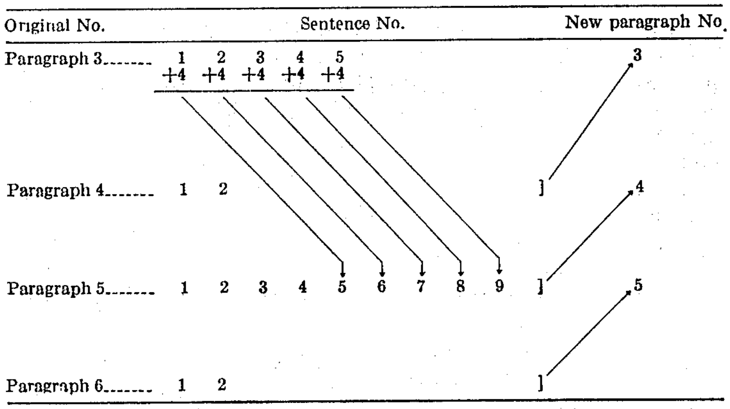

For example, it may be assumed that eight paragraphs are recorded. The operator presses the Combine button 15 followed by paragraph button 3 (group 16*a*) and the paragraph button 5 (group 16*b*). During memory cycle MC 1, register 30 counts to insure that the total number of sentences in both paragraphs is less than 16. A Register 31 registers the number of sentences, that is "4", in the paragraph associated with the second button depressed, that is "5". During memory cycle MC 2, this number is added to the sentence location number of each cell associated with the paragraph indicated by the first paragraph button pressed, that is paragraph 3. Also, cells containing paragraph location numbers higher than that registered by the first operation of the paragraph index buttons, have a "1" count subtracted from the number in the paragraph portion of the memory output triggers, so that paragraphs 4, 5 and 6, become new paragraphs 3, 4 and 5, respectively.

At the beginning of memory cycle MC 2, sentence register 4 is reset to 000 which is used to designate sentence number one. Main memory 6 again is scanned looking for a cell whose contents correspond to the same paragraph and sentences registered in the paragraph register 9 and sentence register 4. When this cell is found, the index control circuit 12 positions the record/playback head 11 to this cell which corresponds to the first sentence of the "where" paragraph.

General Description

Record Notes Feature

Providing an index slip for dictation has always been a problem. Its use depends mainly on the availability of such a slip when the dictator is to dictate and the availability of a means to keep the index slip associated with the belt to which it relates. Several scanning means have been suggested thus far which would allow the operator to scan the belt ahead of time to determine the location of instructions. Such scanning requires that the operator scan all belts prior to transcription even if no instructions are present.

In the present case, the first 16 sentences of any belt are reserved for these instructions. Secondly, the operator accesses the first empty cell in this group of 16 sentences upon pushing the Record Notes to Typist button 40, FIG. 3. Also, following the recording of the instruction, when the End of Sentence bar 41 is depressed, by the dictator, the head 11 is automatically returned to the start of the sentence which was being dictated prior to pressing the Record Notes to Typist button 40. This allows the operator to dictate notes in a special paragraph designated for this and return to his dictation without any concern over the organization of the document.

Detailed Description

FIG. 3 is a block diagram that shows how the internal organization of the machine provides this function. As an example, consider that the operator has recorded two complete paragraphs and is about to dictate the third sentence of the third paragraph. At this point, the operator wishes to record a note indicating to the typist that three copies of this document are required rather than two. The operator simply pushes the Record Notes to Typist button 40. This sets the Record Notes to Typist register 43, starts memory clock 3, and sets the Instructional latch 45 (INSL) by the "RN" output. During the first memory cycle MC 1, the outputs of the Paragraph register 9 and Sentence register 4 are gated into the auxiliary register 48. Next, the Paragraph register is set to 000 which is the location of the instruction paragraph. The sentence register 4 is the reset. During the second memory cycle MC 2, main memory 6 is scanned for sentences or instructions in the instruction paragraph. Each time such an instruction is detected, the Sentence register 4 is advanced one count.

In this manner, all of the instructions are counted. Upon completion of the second memory cycle, Sentence register 4 will contain the location of the next available sentence in the instruction paragraph.

Memory cycle MC 3 follows directly after memory cycle MC 2 and causes the main memory to hunt until an empty cell is found. When this occurs, the Finish Memory Cycle (FMC) circuit 50 resets the Record Notes to Typist register 43 and indicates that an index cycle should begin. Index control unit 12 then causes the head 11 to move to the location of a cell which is described by the memory selection triggers 51. The operator then records the instruction that "three copies will be required" and completes the instruction by hitting the End of Sentence bar 41. The End of Sentence bar 41 sets the End of Sentence (EAS) register 54. This, in conjunction with Instruction latch 45 INSL output gates the original sentence and paragraph locations which have been stored in the auxiliary register 48 back into the paragraph and sentence registers, instead of stepping on to the next sentence which is the normal function of the End of Sentence control 54. When the "all zeros" location is removed from the paragraph register 9 the Instruction latch 45 is reset, indicating that the system is no longer in the instruction paragraph. Finally, during the third memory chcle MC 3, when a comparison occurs between the paragraph and sentence location registers and the memory output triggers 33, a finished memory cycle is detected by circuit 55 and through circuit 50 resets ($\overline{\text{FMC}}$ Reset) the End of Sentence control register. This, as before, causes the index control circuit 12 to move the head 11 to a position designated by the output of the memory selection triggers 51.

The above procedure leaves the operator back at the beginning of the third sentence of the third paragraph. This allows the operator to continue in an uninterrupted sequence, but still places the instruction notes to the typist at the beginning of the document where they will be heard by the typist before she begins typing the document, and locates them in a position where they can be referred to again easily by the operator without searching.

General Description

Sentence Extension Scheme

In a random access audio file in which full utilization of the audio medium is to be obtained, no cells are reserved. The first sentence recorded (typically, less than 24 seconds) occupies the first cell. The second sentence recorded occupies the second cell. The third sentence - the third cell and so on. In such a system, there are no empty cells (other than those deleted) within the body of the recording.

Difficulty occurs when a dictator in reviewing a cell, located immediately prior to a cell filled with a different sentence, wishes to dictate a sentence longer than the 24 seconds available in that cell. Obviously, to continue dictating would wipe out the first part of the sentence following. Therefore, circuitry is provided to look ahead in the memory to determine that the next cell is unavailable, provide audible warning and lockout signals to alert the dictator, and provide a key to allow the operator to link this audio cell with the next unrecorded cell available.

Detailed Operation

Figure 4:
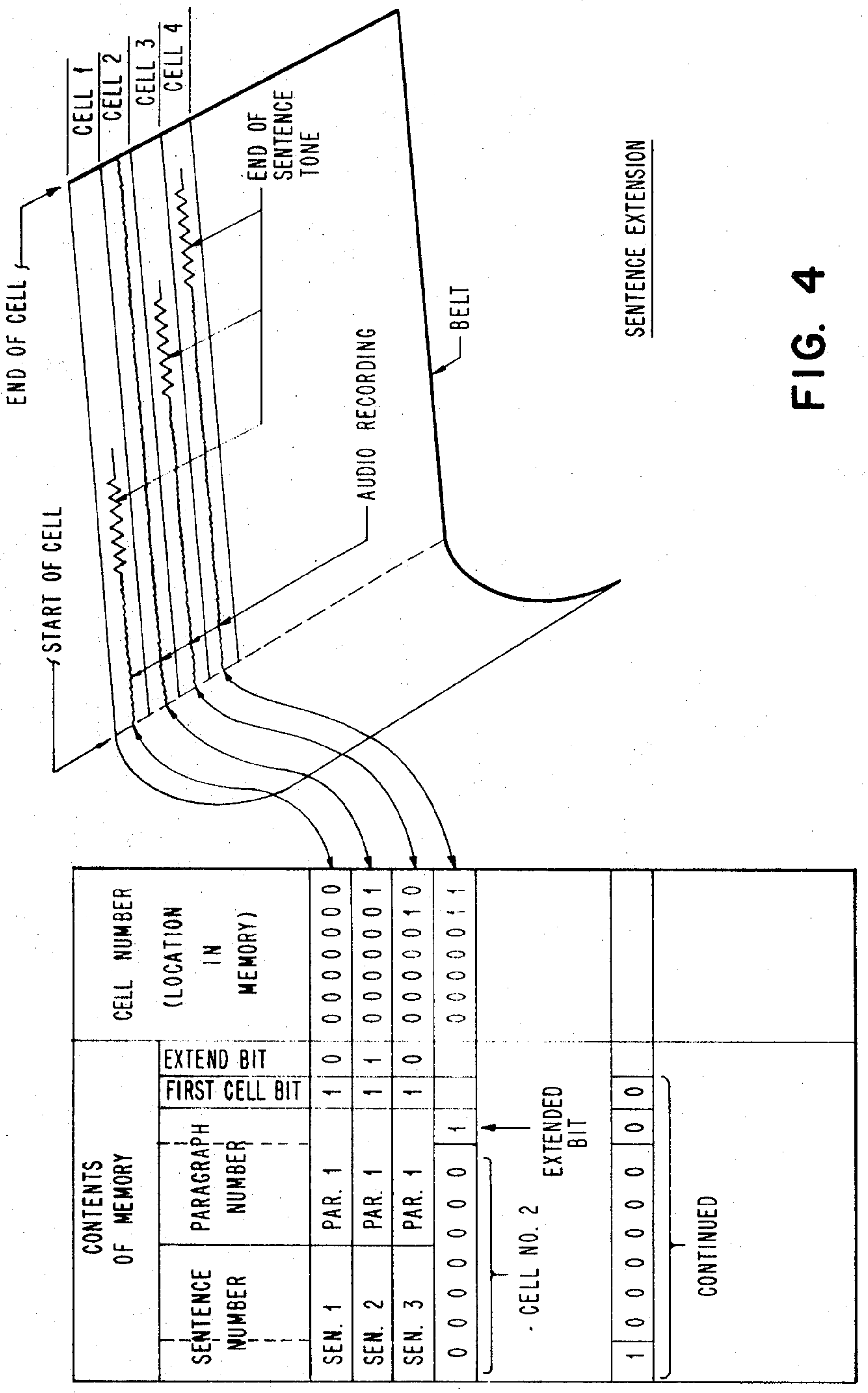
FIG. 4 illustrates the arrangement of audio segments in individual storage cells on a record medium, such as a belt, and further shows control information stored with the individual cells and the revision capabilities involving the extension of sentences.

This is accomplished in the following manner. It is assumed that the dictator has dictated three sentences as shown in FIG. 4. In memory locations "00000000" associated with the first audio cell, eight digits have been recorded designating sentence number one, paragraph number one (Sen 1, Par 1).

Likewise, in memory locations associated with cells number two and three, digital codes have been recorded identifying sentences 2 and 3, respectively. This is the setup if the dictator dictated sentences 1, 2 and 3 in that sequence.

Now if after reviewing sentence number 2, the dictator wishes to redictate the end of the sentence, running the sentence all the way to the end of the cell, the dictator would be locked out after appropriate alarm signals. This is shown in FIG. 4 by the recording line at the end of the cell. At this lockout point, the light under a pushbutton marked Expand, not shown would be lit. In order to complete the sentence, the dictator simply presses the Expand button. This records the fact that a particular sentence has been extended. Next, the memory locates the first unused cell and records not the eight bits representative of the sentence and paragraph number, but rather 7 bits representative of the number of the first cell in the sentence. In this example, the cell number is 0000001 as shown in FIG. 4. Simultaneously, the record head mechanism moves to the new cell location and upon arrival causes the lamp associated with the sentence to blink, indicating that the dictator may continue to dictate in the new cell.

During a playback operation, in reviewing the sentence in question, it is noted in memory that the first cell of the sentence is marked to indicate that the cell has been extended. This is done when first positioning the playback head to the first cell of the sentence. When the audio porton of the first cell has been played out, the memory automatically searches for a cell marked with the address of the first cell of the sentence rather than a cell marked with the next sentence location. If any cell is further extended, the "re-extend" bit location is marked and is recognized by the system to initiate searching of memory for the next sentence extension which is addressed by the code of the cell location presently being reviewed. In this manner, cells may be extended and re-extended to provide sentences of any length.

If dictation continues into an empty succeeding cell designated a "continued" cell, the first bit of the cell information in memory is marked with a "1" to so indicate.

While the invention has been particularly shown and described with reference to several embodiments, it will be understood by those skilled in the art that various changes in form and detail may be made without departing from the spirit and scope of the invention.

What is claimed is:

1. A dictation system for recording and reproducing audio information in conjunction with a record medium having a plurality of storage cells, each capable of storing an audio segment dictated by an operator, such as a sentence, with an individual group of sentences comprising a paragraph, comprising:

positioning means for positioning a said record medium for processing;

recording means for recording each sentence in a respective one of said storage cells;

first indicia means controlled by an operator to provide indicia indicative of the termination of each audio segment dictated by said operator;

means responsive to said first indicia means for controlling said recording means to terminate recording of each sentence in an individual storage cell on said record medium;

second indicia means controlled by an operator to provide indicia indicative of the grouping of a plurality of sentences into a paragraph;

sequence means responsive to indicia from said first indicia means and to indicia from said second indicia means for maintaining a record of the grouping of paragraphs and sentences recorded on said record medium; and split means selectively controlled by an operator for splitting a plurality of sentences of a selected paragraph into two or more paragraphs each comprising at least one sentence segment, said split means being operable to revise the sequence record maintained by said sequence means to reflect the split arrangement of sentences and paragraphs selected by said operator.

2. A dictation system for reproducing audio information in conjunction with a record medium, having a plurality of storage cells storing audio segments dictated by an operator, such as sentences, with an individual group of sentences comprising a paragraph, comprising:

positioning means for positioning a said record medium for processing;

first indicia on said record medium indicative of the termination of each audio segment dictated by said operator;

second indicia on said record medium indicative of the grouping of a plurality of sentences into a paragraph;

sensing means for sensing and providing signals representative of said first indicia and of said second indicia;

sequence means responsive to signals from said sensing means for maintaining a record of the grouping of paragraphs and sentences recorded on said record medium; and split means selectively controlled by an operator for splitting a plurality of sentences of a selected paragraph into two or more paragraphs each comprising at least one sentence segment, said split means being operable to revise the sequence record maintained by said sequence means to reflect the split arrangement of sentences and paragraphs selected by said operator.

3. The apparatus of claim 2 further comprising:

a Split button operable by said operator and providing an output indicative of a Split operation;

at least one Paragraph button providing an output for selecting an original Paragraph to be split;

at least one Sentence button providing an output for selecting a sentence in the paragraph selected by said Paragraph button at which a new paragraph is to start;

and means associated with said split means and responsive to outputs from said Split, Paragraph, and Sentence buttons for initiating operation of said split means.

4. The apparatus of claim 3 further comprising:

means for renumbering a sentence selected by said Sentence button and higher numbered sentences in said original paragraph when splitting of said paragraph occurs and said selected sentence and higher numbered sentences are assigned by said split means to said new paragraph.

5. A dictation system for recording and reproducing audio information in conjunction with a record medium, having a plurality of storage cells, each capable of storing an audio segment dictated by an operator, such as a sentence with an individual group of sentences comprising a paragraph, comprising:

positioning means for positioning a said record medium for processing;

recording means for recording each sentence in a respective one of said storage cells first indicia means controlled by an operator to provide indicia indicative of the termination of each audio segment dictated by said operator;

means responsive to said first indicia means for controlling said recording means to terminate recording of each sentence in an individual storage cell on said record medium;

second indicia means controlled by an operator to provide indicia indicative of the grouping of a plurality of sentences into a paragraph;

sequence means responsive to indicia from said first indicia means and to indicia from said second indicia means for maintaining a record of the grouping of paragraphs and sentences recorded on said record medium; and combine means selectively controlled by an operator for automatically in a single operation combining two or more paragraphs, one of said paragraphs comprising at least one sen-tence segment and another of said paragraphs comprising at least two sentence segments, said combine means being operable to revise the sequence record maintained by said sequence means to reflect the combined arrangement of sentences and paragraphs selected by said operator.

6. A dictation system for reproducing audio information in conjunction with a record medium, having a plurality of storage cells storing audio segments dictated by an operator, such as sentences, with an individual group of sentences comprising a paragraph, comprising:

positioning means for positioning a said record medium for processing;

first indicia means on said record medium indicative of the termination of each audio segment dictated by said operator;

second indicia on said record medium indicative of the grouping of a plurality of sentences into a paragraph;

sensing means for sensing and providing signals representative of said first indicia and of said second indicia;

sequence means responsive to signals from said sensing means for maintaining a record of the grouping of paragraphs and sentences recorded on said record medium; and combine means selectively controlled by an operator for automatically in a single operation combining two or more paragraphs, one of said paragraphs comprising at least one sentence segment and another of said paragraphs comprising at least two sentence segments, said combine means being operable to revise the sequence record maintained by said sequence means to reflect the combined arrangement of sentences and paragraphs selected by said operator.

7. The apparatus of claim 6, further comprising:

means for renumbering all sentences in one of said paragraphs when combining said one paragraph with the other of said paragraphs.

8. The apparatus of claim 6 further comprising:

a Combine button operable by said operator and providing an output indicative of a combine operation;

a first Paragraph button providing an output for selecting a first Paragraph to be combined;

a second Paragraph button providing an output for selecting a second paragraph to be combined;

and means associated with said combine means and responsive to outputs from said Combine, and said first and second Paragraph buttons for initiating operation of said combine means.

9. The apparatus of claim 7 wherein said first Paragraph button indicates a paragraph to be transferred and wherein said second Paragraph button indicates a paragraph to receive said transferred paragraph, and further comprising:

transfer means associated with said combine means for transferring said paragraph selected by said first Paragraph button to said paragraph selected by said second Paragraph button.

10. The apparatus of claim 9 further comprising:

means for renumbering all sentences in said paragraph to be transferred when said paragraph to be transferred is combined with said receiving paragraph.

11. A dictation system for recording and reproducing audio information in conjunction with a record medium having a plurality of storage cells, each capable of storing an audio segment dictated by an operator, such as a sentence with an individual group of sentences comprising a paragraph, and said record medium having at least one instruction cell capable of storing special instruction material for a typist, comprising:

positioning means for positioning a said record medium for processing;

recording means for recording each sentence in a respective one of said storage cells;

first indicia means controlled by an operator to provide indicia indicative of the termination of each audio segment dictated by said operator;

means responsive to said first indicia means for controlling said recording means to terminate recording of each sentence in an individual storage cell on said record medium;

second indicia means controlled by an operator to provide indicia indicative of the grouping of a plurality of sentences into a paragraph;

means responsive to indicia from said first indicia means and to indicia from said second indicia means for maintaining a record of the grouping of paragraphs and sentences recorded on said record medium;

selection means including a Record Notes to Typist switch operable by said operator for selecting said instruction cell for recording purposes;

means associated with said recording means and responsive to audio instruciton signals from said operator for recording said audio instruction signals in said instruction cell;

return means for maintaining a record of a current sentence being recorded when said instruction cell is selected; and means for returning said recording means to said current sentence cell upon completion of recording of said instruction.

12. A dictation system for recording and reproducing audio information in conjunction with a record medium having a plurality of storage cells, each capable of storing an audio segment dictated by an operator, such as a sentence, and said record medium having at least one instruciton cell capable of storing special instruction material for a typist, comprising:

positioning means for positioning a said record medium for processing;

recording means for recording each sentence in a respective one of said storage cells;

indicia means controlled by an operator to provide indicia indicative of the termination of each audio segment dictated by said operator;

means responsive to said first indicia means for controlling said recording means to terminate recording of each sentence in an individual storage cell on said record medmiu;

means responsive to indicia from said indicia means for maintaining a record of said sentences recorded on said record medium;

selection means including a Record Notes to Typist switch operable by said operator for selecting said instruction cell for recording purposes;

means associated with said recording means and responsive to audio instruction signals from said operator for recording said audio instruction signals in said instruction cell;

return means for maintaining a record of a current sentence being recorded when said instruction cell is selected;

and means for returning said recording means to said current sentence cell upon completion of recording of said instruction.

13. A dictation system for recording audio information in conjunction with a record medium having a plurality of storage cells, each capable of storing an audio segment dictated by an operator, and said record medium having at least one instruction cell capable of storing special instruction material for a typist, comprising:

positioning means for positioning a said record medium for processing;

recording means for recording audio information in said storage cells;

selection means including a Record Notes to Typist switch operable by said operator for selecting said instruction cell for recording purposes;

means associated with said recording means and responsive to audio instruction signals from said operator for recording said audio instruction signals in said instruction cell;

return means for maintaining a record of a current sentence being recorded when said instruction cell is selected;

and means for returning said recording means to said current sentence cell upon completion of recording of said instruction.

14. The system of claim 13 wherein a plurality of instruction cells is provided on said record medium, and further comprising:

assignment means associated with said recording means and responsive to successive operation of said selector means for selecting each of said plurality of instruction cells in succession for storage of audio instructions.

15. A dictation system for recording audio information in conjunction with a record medium having a plurality of storage cells, each capable of storing an audio segment of predetermined length dictated by an operator, such as a sentence, sentences longer than said predetermined length comprising a first incomplete portion and at least a second completion portion, said system comprising:

positioning means for positioning a said record medium for processing;

recording means for recording each sentence in a respective one of said storage cells;

indicia means controlled by an operator to provide indicia indicative of the termination of each audio segment dictated by said operator;

means responsive to said indicia means for controlling said recording means to terminate recording of each sentence in an individual storage cell on said record medium;

means responsive to indicia from said indicia means for maintaining a record of the sentences recorded on said record medium;

extend means for recognizing the dictation of a sentence longer than said predetermined length and for operating said recording means to record the first portion of said longer sentence in a selected storage cell on said record medium; and linking means controlled by said extend means for selecting at least one more storage cell and for recording therein the completion portion of said longer sentence.

16. The system of claim 15 further comprising:

interlock means for alerting an operator that a dictated sentence is longer than said predetermined cell length and that said extend means has been activated.

17. The system of claim 15 further comprising:

an Expand button incorporated in said linking means and manually operable by an operator for activating said linking means.

18. The system of claim 15 further comprising:

marking means for marking with a special linking code individual cells used for the portions of individual longer sentences to link said cells together for later reproduction of said longer sentences.

19. The system of claim 15 wherein a plurality of successively arranged sentence cells contain audio information, and further comprising:

means operable by an operator for selecting an intermediately arranged sentence cell to record a revised sentence therein; and means associated with said recognition means for selecting a next succeeding empty cell for continuation of said revised sentence.

20. A dictation system for reproducing audio information in conjunction with a record medium having a plurality of storage cells, each capable of storing an audio segment of predetermined length dictated by an operator, such as a sentence, and said record medium having continuation indicia indicative of continuation in at least two successive cells of a long sentence longer than said predetermined length, said system comprising:

positioning means for positioning a said record medium for processing;

reproducing means for reproducing information on said record medium;

indicia means for recording on said record medium indicia indicative of each audio segment dictated by said operator as well as continuation indicia;

means responsive to indicia on said record medium for maintaining a record of the sentences recorded on said record medium;

extend means responsive to said continuation indicia for recognizing the occurrence of an extended sentence longer than said predetermined length; and means controlled by said extend means for selecting the cells of said record medium in which said longer sentence is continued.

21. A dictation system for reproducing audio information in conjunction with a record medium having a plurality of storage cells, each capable of storing an audio segment of predetermined length dictated by an operator, such as a sentence, and said record medium having extension indicia indicative of extension in at least two non-successive cells of succeeding portions of a long sentence longer than said predetermined length, said system, comprising:

positioning means for positioning a said record medium for processing;

reproducing means for reproducing information on said record medium;

segment indicia on said record medium indicative of each audio segment dictated by said operator;

means responsive to said segment indicia for maintaining a record of the sentences recorded on said record medium;

extend means responsive to said extension indicia for recognizing the occurrence of an extended sentence longer than said predetermined length and for operating said reproducing means to reproduce a first portion of said extended sentence; and means controlled by said extend means for selecting the non-successive cells on said record medium in which said extended sentence is continued and for further operating said reproducing means to reproduce succeeding portions of said extended sentence.

* * * * *